US010029884B2

(12) United States Patent
Youker et al.

(10) Patent No.: US 10,029,884 B2
(45) Date of Patent: Jul. 24, 2018

(54) BUILDING MANAGEMENT SYSTEM INTEGRATED WITH ELEVATOR DISPLAY

(71) Applicant: OTIS ELEVATOR COMPANY, Farmington, CT (US)

(72) Inventors: Jeremy Youker, Torrance, CA (US); Brian Beloin, Avon, CT (US); Narayan S. Tavildar, Farmington, CT (US); Samuel R. Talbot, Marlborough, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/262,869

(22) Filed: Sep. 12, 2016

(65) Prior Publication Data

US 2017/0073187 A1   Mar. 16, 2017

Related U.S. Application Data

(60) Provisional application No. 62/218,326, filed on Sep. 14, 2015.

(51) Int. Cl.
*B66B 3/00*   (2006.01)
*G05B 19/042*   (2006.01)
(Continued)

(52) U.S. Cl.
CPC ............ *B66B 3/008* (2013.01); *B66B 1/3461* (2013.01); *B66B 3/00* (2013.01); *B66B 5/0025* (2013.01);
(Continued)

(58) Field of Classification Search
CPC ......... B66B 9/02; B66B 3/008; B66B 1/3461; B66B 3/00
(Continued)

(56) References Cited

U.S. PATENT DOCUMENTS

| 4,630,026 A | * | 12/1986 | Lewis | ..................... B66B 3/023 |
| | | | | 187/399 |
| 5,197,570 A | * | 3/1993 | Matsui | ..................... B66B 9/003 |
| | | | | 187/249 |

(Continued)

FOREIGN PATENT DOCUMENTS

| CN | 203102804 U | 7/2013 |
| CN | 102530668 B | 12/2014 |

(Continued)

OTHER PUBLICATIONS

Kone Infoscreen, http://www.kone.in/elevators-lifts/enhancements/infoscreen.

(Continued)

*Primary Examiner* — David Warren
(74) *Attorney, Agent, or Firm* — Cantor Colburn LLP

(57) ABSTRACT

A building management system of an occupiable structure with an elevator system includes an elevator video display, a building computing device and a building status system. The building computing device includes a computer processor and a computer readable storage medium. The building status system is configured to send real-time building condition signals to the building computing device, and the building status system is configured to process the real-time building condition signals and output an associated information signal for display on the elevator video display.

22 Claims, 2 Drawing Sheets

(51) Int. Cl.
  *B66B 1/34* (2006.01)
  *B66B 5/00* (2006.01)
  *G06F 3/041* (2006.01)
  *B66B 5/02* (2006.01)
  *H04L 29/08* (2006.01)

(52) U.S. Cl.
  CPC .............. *B66B 5/022* (2013.01); *B66B 5/024* (2013.01); *G05B 19/0428* (2013.01); *G06F 3/041* (2013.01); *G05B 2219/2659* (2013.01); *H04L 67/12* (2013.01)

(58) Field of Classification Search
  USPC ........................................................ 187/393
  See application file for complete search history.

(56) References Cited

U.S. PATENT DOCUMENTS

| | | | | |
|---|---|---|---|---|
| 5,253,734 A * | 10/1993 | Laurutis | ................... | A62B 1/02 187/239 |
| 5,955,710 A * | 9/1999 | DiFranza | ................... | B66B 1/34 187/247 |
| 5,979,607 A * | 11/1999 | Allen | ................... | B66B 5/024 187/384 |
| 6,578,675 B2 | 6/2003 | Wilson et al. | | |
| 7,270,219 B2 | 9/2007 | Amo et al. | | |
| 7,552,801 B2 | 6/2009 | Trifu | | |
| 8,230,981 B2 | 7/2012 | Newville et al. | | |
| 8,493,230 B2 | 7/2013 | Hikita et al. | | |
| 8,719,037 B2 * | 5/2014 | Gazdzinski | ........ | G06Q 30/0251 187/396 |
| 8,738,276 B1 * | 5/2014 | Boss | ................... | B61L 27/04 455/404.1 |
| 2002/0112925 A1 | 8/2002 | DiFranza et al. | | |
| 2002/0012995 A1 | 9/2002 | Friedli et al. | | |
| 2002/0129995 A1 * | 9/2002 | Friedli | ................... | B66B 3/00 187/392 |
| 2003/0057029 A1 * | 3/2003 | Fujino | ................... | B66B 3/00 187/391 |
| 2006/0201751 A1 * | 9/2006 | Kawai | ................... | B66B 5/024 187/313 |
| 2008/0196978 A1 * | 8/2008 | Siikonen | ................ | B66B 5/022 187/384 |
| 2011/0128159 A1 | 6/2011 | Hikita et al. | | |
| 2011/0199488 A1 | 8/2011 | Gorilovskij et al. | | |
| 2013/0116835 A1 | 5/2013 | Nowel | | |
| 2015/0048953 A1 * | 2/2015 | Murphy, Jr. | ........... | G08B 25/14 340/691.6 |
| 2015/0114763 A1 * | 4/2015 | Kim | ................... | B66B 5/0012 187/392 |
| 2017/0036887 A1 * | 2/2017 | Roberts | ................... | B66B 1/30 |
| 2017/0045493 A1 * | 2/2017 | van der Woude | .... | B66B 7/1215 |
| 2017/0073187 A1 * | 3/2017 | Youker | ................... | B66B 3/008 |
| 2017/0073193 A1 * | 3/2017 | Kuczek | ................ | B66B 11/0407 |
| 2017/0107080 A1 * | 4/2017 | Steinhauer | ............... | B66B 9/003 |
| 2017/0109132 A1 * | 4/2017 | Gazdzinski | ............. | G06F 3/167 |

FOREIGN PATENT DOCUMENTS

| | | | | |
|---|---|---|---|---|
| CN | 1319837 C | 6/2016 | | |
| EP | 0403232 A2 | 12/1990 | | |
| EP | 0471464 A2 * | 2/1992 | ............. | B66B 9/003 |
| JP | H04159985 A | 6/1992 | | |
| JP | 2003146547 A | 5/2003 | | |
| KR | 20100133018 A * | 12/2010 | ............. | B66B 5/021 |
| WO | 0144095 A1 | 6/2001 | | |
| WO | WO 2008136692 A2 * | 11/2008 | ............... | B66B 9/02 |

OTHER PUBLICATIONS

Bialy, Louis et al. "Potential Role of Elevators During Emergencies" Elevator World, Jul. 1, 2004 (13 pages).
Partial European Search Report for application No. 16275135.8-1731 dated Feb. 21, 2017 (9 pages).

* cited by examiner

BUILDING MANAGEMENT SYSTEM INTEGRATED WITH ELEVATOR DISPLAY

CROSS REFERENCE TO RELATED APPLICATION

This application claims priority to U.S. Provisional Patent Application No. 62/218,326, filed Sep. 14, 2015, the entire contents of which is incorporated herein by reference.

BACKGROUND

The present disclosure relates to a building management system and, more particularly, to a building management system adapted to communicate with an elevator video display in real-time.

Building management systems are known to enhance the life and safety of occupants in a building by leveraging safety and convenience-based systems through automation and instructional communication with building occupants. The same buildings may include elevator systems having elevator management systems capable of communication directly with an elevator car. Improvements in real-time communication between the building management system, the elevator management system and occupants of or proximate to an elevator car is desirable.

SUMMARY

A building management system of an occupiable structure having an elevator system according to one, non-limiting, embodiment of the present disclosure includes an elevator video display; a building computing device including a computer processor and a computer readable storage medium; and a building status system configured to send real-time building condition signals to the building computing device, and wherein the building status system is configured to process the real-time building condition signals and output an associated information signal for display on the elevator video display.

Additionally to the foregoing embodiment, the elevator video display is in an elevator car.

In the alternative or additionally thereto, in the foregoing embodiment, the elevator video display is located on a building floor proximate to an elevator hoistway.

In the alternative or additionally thereto, in the foregoing embodiment, the building status system includes a fire alert system.

In the alternative or additionally thereto, in the foregoing embodiment, the building status system includes a security alert system.

In the alternative or additionally thereto, in the foregoing embodiment, the building status system includes an environmental alert system.

In the alternative or additionally thereto, in the foregoing embodiment, the building status system includes an energy usage alert system.

In the alternative or additionally thereto, in the foregoing embodiment, the building status system includes at least one of a fire alert system, a security alert system, an environmental alert system, an energy usage alert system and an elevator service alert system.

In the alternative or additionally thereto, in the foregoing embodiment, the elevator video display is an interactive touch screen.

In the alternative or additionally thereto, in the foregoing embodiment, the building management system includes a building management input/output device configured to input control commands to the building computing device.

In the alternative or additionally thereto, in the foregoing embodiment, the building management system includes a building management input/output device configured to input control commands to the building computing device and conduct two-way communication with the elevator video display.

In the alternative or additionally thereto, in the foregoing embodiment, the building management system includes an elevator service computing device including a computer processor and a computer readable storage medium, and wherein the elevator service computing device is configured to send a communication signal to the elevator video display indicative of elevator service.

In the alternative or additionally thereto, in the foregoing embodiment, the building management system includes an elevator input/output device configured to input control commands to the elevator service computing device.

In the alternative or additionally thereto, in the foregoing embodiment, the elevator input/output device is configured to conduct two-way communications with the elevator video display.

In the alternative or additionally thereto, in the foregoing embodiment, the elevator service computing device is configured to communicate with the building management computing device.

An elevator management system according to another, non-limiting, embodiment includes an elevator video display proximate to an elevator hoistway in a building; and an elevator service computing device including a computer processor and a computer readable storage medium, and wherein the elevator service computing device is configured to send an information signal to the elevator video display indicative of elevator repair and maintenance services.

Additionally to the foregoing embodiment, the elevator management system includes a satellite navigation transmitter circuit configured to send a location signal to the elevator service computing device indicative of a real-time location of an on-route elevator service repair personnel, and wherein the elevator service computing device includes a satellite navigation receiver circuit configured to receive the location signal.

In the alternative or additionally thereto, in the foregoing embodiment, the processor of the elevator service computing device processes the location signal into the information signal as a real-time local street map displayed on the elevator video display.

In the alternative or additionally thereto, in the foregoing embodiment, the elevator management system includes a building computing device including a computer processor and a computer readable storage medium; and a building status system configured to send real-time alerts to the building computing device, and wherein the building status system is configured to process the real-time alerts and output an associated information signal for display on the elevator video display.

A method of operating a building management system according to another, non-limiting, embodiment includes generating a building condition signal from a building status system; receiving the building condition signal by a building computing device; processing the building condition signal by a processor and a computer readable storage medium of the building computing device into an information signal; and sending the information signal in real-time to an elevator video display.

Additionally to the foregoing embodiment, the information signal provides elevator occupants visual instructions based at least in-part on the building condition signal.

In the alternative or additionally thereto, in the foregoing embodiment, the method includes sending a real-time elevator car location signal to the building computing device, and wherein the information signal is in-part based on the real-time location of the elevator car.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
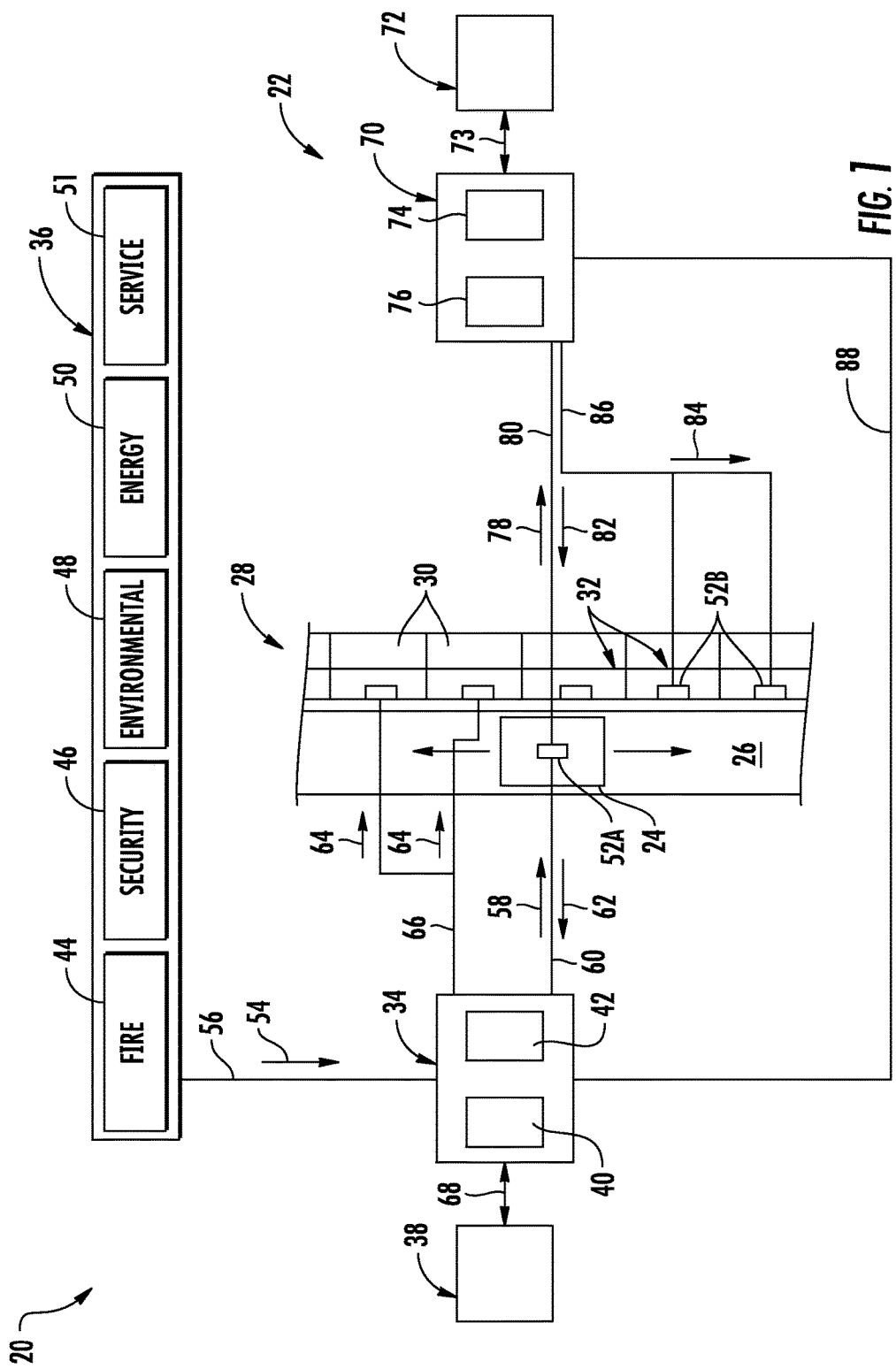
FIG. 1 is a schematic of an occupiable structure management system with an elevator system as one, non-limiting, exemplary embodiment of the present application.

Referring to FIG. 1, an exemplary embodiment of a building management system 20 is integrated into, or generally includes, an elevator management system 22 as illustrated. The building management system 20 may interface with an elevator car 24 constructed and arranged to move along a hoistway 26 in a building or occupiable structure 28 having multiple floors or levels 30. An elevator station 32 may be located at each floor 30 and may include a means of signaling to the elevator car 24 an individual's desire to travel up or down.

The building management system may further include a building computing device 34, a building status system 36 and a building management user interface 38. The building computing device 34 may include control circuitry such as a computer processor 40 and a computer readable storage medium 42. The storage medium 42 may include hard disk drive storage, nonvolatile memory (e.g., flash memory or other electrically-programmable-read-only memory configured to form a solid state drive), volatile memory (e.g., static or dynamic random-access-memory), and others. The processor 40 may be based on one or more microprocessors, microcontrollers, digital signal processors, baseband processors, power management units, audio codec chips, application specific integrated circuits, and others.

The processor 40 and storage medium 42 may be used to control and/or receive signals from any one or more systems of the building status system 36. The building status system 36 may include at least one of a fire alert system 44, a security alert system 46, an environmental alert system 48, an energy usage alert system 50, elevator service alert system 51 and other systems indicative of a status of the building 28. Example of multi-level, occupiable, structures 28 may include residential homes, apartment buildings, commercial buildings, ships, service centers such as hospitals and hotels, and other structures. The occupiable structure 28 may have any number of floors 30 each having any number of rooms (not shown). The floors 30 and rooms may be interconnected by a plurality of routes (i.e., entry and egress) that may include hallways, stairs, elevators, and others.

Figure 2:
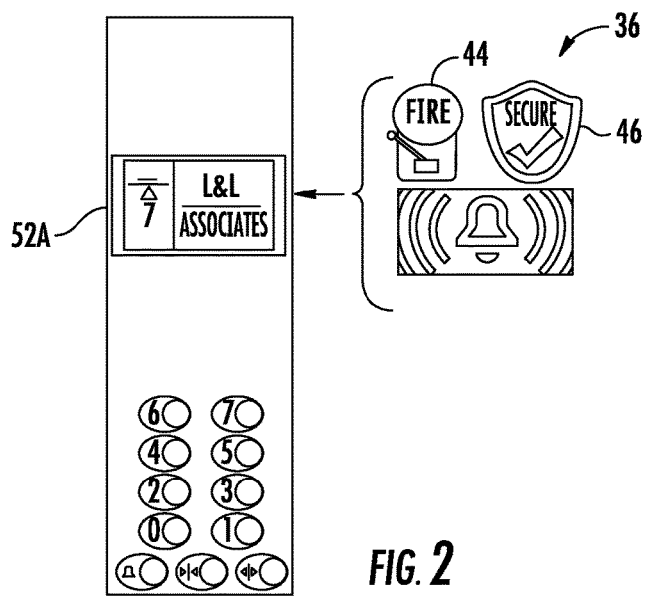
FIG. 2 is a front view of an elevator video display of the management system.

Referring to FIGS. 1 and 2, the building management system 20 and the elevator management system 22 are configured to interface with an elevator video display 52A located in the elevator car 24 and/or any one or more of a plurality of elevator video displays 52B located at each elevator station 32. Each video display 52B may include the means of signaling to the elevator car 24 of an individual's desire to travel up or down. The video display 52B may also include information on the real-time location of the elevator car 24 as the individual waits to board. The video displays 52A, 52B may be interactive, may be touch screens, and may further include audio capability.

The building computer processor 40 of the building computing device 34 is configured to receive building condition and/or alert signals (see arrow 54) in real-time over a pathway 56. The building computer processor 40 may process the building condition signals 54 utilizing information pre-programmed into the computer readable medium 42 and may send a first information signal (see arrow 58) over pathway 60 to the elevator video display 52A in real-time. The context of the information signal 58 may be dependent upon the real-time location of the elevator car 24. In such a circumstance, the building computing device 34 may also be configured to receive a real-time elevator car position signal (see arrow 62) that may be sent over pathway 60. Similarly, the building computer device 34 may send a second information signal (see arrow 64) over pathway(s) 66 (and indicative of the building condition signal 54) to one or more of the elevator video displays 52B of the elevator stations 32. The content of the second information signal 64 may be further dependent upon the location of the elevator station 32. The pathways 56, 60, 66 may be wired or wireless pathways. Non-limiting examples of wired pathways may include pathways that pass through the internet, local area network equipment, and other networks. Non-limiting examples of wireless pathways may include cellular telephone network pathways, local area network pathways, and others.

The alert systems 44, 46, 48, 50 of the building condition system 36 may each include a plurality of sensors (not shown) distributed throughout the occupiable structure 28 (i.e., floors, rooms, stairs, hallways, etc.). The detectors may be any type of detector (e.g., sensory, video, etc.) and is dependent upon the condition to be detected. Each system 44, 46, 48, 50 may include a computer processor or may otherwise utilize the processor 40 of the building computing device 34 to determine the parameters of a detected condition. Such parameters may include the degree, location and/or propagation of a detected building condition. Based on the detected condition and various parameters of the condition, the information signals 58, 64 may include instructions of a building egress route and/or an explanation of why the elevator occupants, or individuals waiting to board the elevator car 24, may not travel to a desired location and/or floor 30. The information signals 58, 64 may be different for any given building condition and may be dependent upon the location of the elevator video displays 52A, 52B.

The fire alert system 44 may include detectors that detect smoke, heat and/or others indicative of a fire. The security system 46 may include motion, video and other detectors to detect unwanted intrusions in any given area. For example, the building condition may be an intrusion and the sensor/detectors may be a plurality of motion sensors located strategically throughout the occupiable structure 28. As each sensor detects motion and sequentially sends a motion detected signal 54 to the processor 40 over pathway 56, the processor 40 along with the computer readable storage medium 42 may track the progression of the intruder and associate the intruder location and resulting progression with a map of the structure (not shown) pre-programmed into the building computing device 34 and displayed on an interactive screen of the elevator video displays 52A, 52B.

The environmental alert system 48 may include gas, particulate, temperature and other detectors to measure the quality level of building air and/or temperatures such as floor temperature. The environmental alert system 48 may also measure and or detect conditions generally external to the occupiable structure such as severe weather, hurricanes, earthquakes and others. The energy alert system 50 may use gas detectors that may detect a dangerous gas leak and/or may measure electrical power consumption that may detect an electrical outage in a given area.

The user interface 38 may be used by building management personnel to program desired information into the building computing device 34 and receive information from the device (see arrow 68). The user interface 38 may further be utilized to communicate with elevator passengers in real-time through the building computing device (e.g., visually and/or audibly) and/or directly to the elevator video displays 52A, 52B.

The elevator management system 22 may include an elevator service computing device 70 and an elevator user interface 72. The elevator service computing device 70 may include control circuitry such as a computer processor 74 and a computer readable storage medium 76. The storage medium 76 may include hard disk drive storage, nonvolatile memory (e.g., flash memory or other electrically-programmable-read-only memory configured to form a solid state drive), volatile memory (e.g., static or dynamic random-access-memory), and others. The processor 74 may be based on one or more microprocessors, microcontrollers, digital signal processors, baseband processors, power management units, audio codec chips, application specific integrated circuits, and others.

The processor 74 and storage medium 76 may be used to control and/or receive signals from any one or more of the elevator video displays 50A, 50B and the building computing device 34. The elevator service computing device 70 may be remotely located and the processor 74 may be used to run embedded and cloud server software such as internet browsing applications, voice-over-internet-protocol (VOIP) telephone call applications, email applications, media playback applications, operating system functions, and others. To support interactions with external equipment such as the elevator video displays 52A, 52B and/or the building computing device 34, the processor 74 may be used in implementing communications protocols. Such communication protocols may include internet protocols, and wireless local area network protocols (e.g. WiFi®), protocols for other short-range wireless communications links such as the Bluetooth® protocol, cellular telephone protocols, and others.

The elevator service computing device 70 may be configured to receive elevator condition and/or alert signals (see arrow 78) in real-time over a pathway 80 that may be wired or wireless. The elevator computer processor 74 may process the elevator condition signal 78 utilizing information pre-programmed into the computer readable medium 74 and may send a first information signal (see arrow 82) over pathway 80 to the elevator video display 52A in real-time. The content of the information signal 82 may include field technician updates, service system maintenance appointments and/or call or message updates that may be indicative of, or a response to, the outgoing signal 78. Alternatively, or in addition thereto, the signal 82 may also automatically place the elevator car 28 or elevator system into a service mode at a desired floor 30 that may be based on scheduled maintenance activities.

The information signal 82 may be automatically sent to the elevator video displays 52A without the need, or prompt, from a condition signal 78. The condition signal 78 may automatically, visually, display on the elevator video displays 52A scheduled maintenance times and activities, updates from field mechanics and other personnel. Similarly, the elevator computer device 70 may send a second information signal (see arrow 84) over pathway(s) 86 (and indicative of the elevator condition) to one or more of the elevator video displays 52B of the elevator stations 32. The content of the second information signal 84 may be similar to or different than signal 82 depending upon a given condition. The pathways 80, 86 may be wired or wireless pathways. It is further understood and contemplated that the elevator service computing device 70 may not communicate directly with the elevator video displays 52A, 52B and may, instead, communicate with the displays through the building computing device 34 via a wire or wireless pathway 88.

The user interface 72 may be used by elevator service personnel to program desired information into the elevator computing device 70 and receive information from the device (see arrow 73). The user interface 72 may further be utilized to communicate with elevator passengers in real-time through the building computing device (e.g., visually and/or audibly) via the pathway 88, and/or to the elevator video displays 52A, 52B via either device 34, 70.

Figure 3:
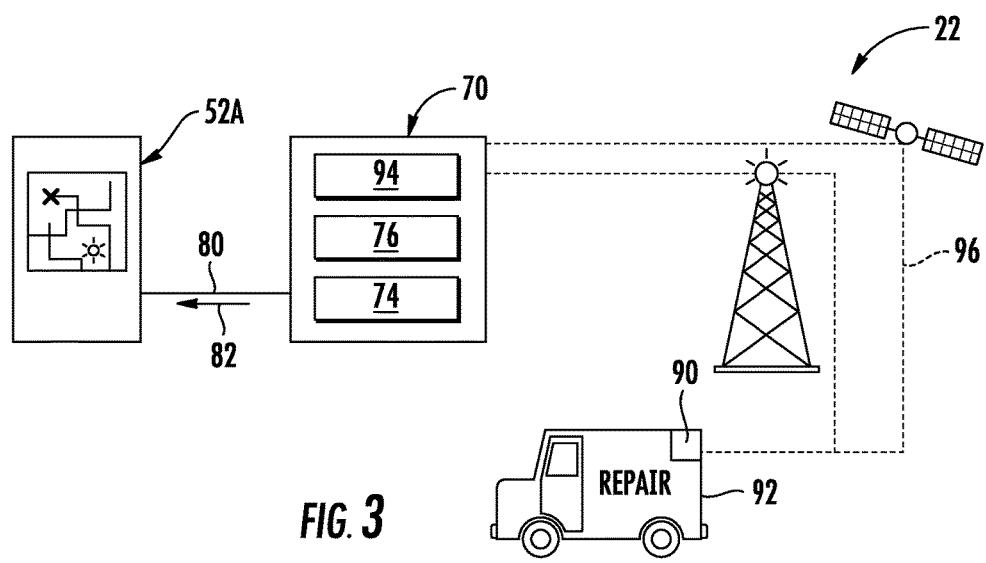
FIG. 3 is a partial schematic of an elevator management system of the occupiable structure management system.

Referring to FIG. 3, the elevator management system 22 may facilitate real-time updates of repair services in progress. For example, during unplanned events such as a scenario example where an elevator car 24 has ceased moving and occupants are confined within the car, the system 22 may provide real-time information on when the repair technician was contacted, if the technician is on-route to make the elevator repair, and if on route, where the technician is located and the travel progress being made. To provide such real-time information to the unexpectedly confined occupants, the elevator management system 22 may include a mobile satellite navigation transmitter circuit 90 located in a repair technician vehicle 92 and/or being part of a repair technician cellular telephone (not shown). The elevator service computing device 70 may further include a satellite navigation receiver circuit 94 (e.g., Global Positioning System).

In operation, and when the repair technician is traveling toward the repair site, the navigation transmitter circuit 90 may transmit a wireless location signal 96 to the satellite navigation receiver circuit 94. The location signal 96 may be processed by the processor 74 and the information signal 82 (i.e., a real-time navigation signal) may be sent to the elevator video display 52A facilitating a visual of a map 100 that depicts the location of the occupiable structure 28 and the real-time, progressive, location of the traveling repair vehicle 92. This feature provides the confined occupants with continuous information depicting the progress being made to secure their release.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A building management system of an occupiable structure having an elevator system comprises:
   an elevator video display;
   a building computing device including a computer processor and a computer readable storage medium; and
   a building status system configured to send real-time building condition signals to the building computing device, and wherein the building status system is configured to process the real-time building condition signals and output an associated information signal for display on the elevator video display.

2. The building management system set forth in claim 1, wherein the elevator video display is in an elevator car.

3. The building management system set forth in claim 1, wherein the elevator video display is located on a building floor proximate to an elevator hoistway.

4. The building management system set forth in claim 1, wherein the building status system includes a fire alert system.

5. The building management system set forth in claim 1, wherein the building status system includes a security alert system.

6. The building management system set forth in claim 1, wherein the building status system includes an environmental alert system.

7. The building management system set forth in claim 1, wherein the building status system includes an energy usage alert system.

8. The building management system set forth in claim 1, wherein the building status system includes at least one of a fire alert system, a security alert system, an environmental alert system, an energy usage alert system and an elevator service alert system.

9. The building management system set forth in claim 1, wherein the elevator video display is an interactive touch screen.

10. The building management system set forth in claim 1 further comprising:
    a building management input/output device configured to input control commands to the building computing device.

11. The building management system set forth in claim 9 further comprising:
    a building management input/output device configured to input control commands to the building computing device and conduct two-way communication with the elevator video display.

12. The building management system set forth in claim 1 further comprising:
    an elevator service computing device including a computer processor and a computer readable storage medium, and wherein the elevator service computing device is configured to send a communication signal to the elevator video display indicative of elevator service.

13. The building management system set forth in claim 12 further comprising:
    an elevator input/output device configured to input control commands to the elevator service computing device.

14. The building management system set forth in claim 13, wherein the elevator input/output device is configured to conduct two-way communications with the elevator video display.

15. The building management system set forth in claim 14, wherein the elevator service computing device is configured to communicate with the building computing device.

16. An elevator management system comprising:
    an elevator video display proximate to an elevator hoistway in a building; and
    an elevator service computing device including a computer processor and a computer readable storage medium, and wherein the elevator service computing device is configured to send an information signal to the elevator video display indicative of elevator repair and maintenance services.

17. An elevator management system comprising:
    an elevator video display proximate to an elevator hoistway in a building;
    an elevator service computing device including a computer processor and a computer readable storage medium, and wherein the elevator service computing device is configured to send an information signal to the elevator video display indicative of elevator repair and maintenance services; and
    a satellite navigation transmitter circuit configured to send a location signal to the elevator service computing device indicative of a real-time location of an on-route elevator service repair personnel, and wherein the elevator service computing device includes a satellite navigation receiver circuit configured to receive the location signal.

18. The elevator management system set forth in claim 17, wherein the processor of the elevator service computing device processes the location signal into the information signal as a real-time local street map displayed on the elevator video display.

19. The elevator management system set forth in claim 16 further comprising:
    a building computing device including a computer processor and a computer readable storage medium; and
    a building status system configured to send real-time alerts to the building computing device, and wherein the building computing device is configured to process the real-time alerts and output an associated information signal for display on the elevator video display.

20. A method of operating a building management system comprising:
    generating a building condition signal from a building status system;
    receiving the building condition signal by a building computing device;
    processing the building condition signal by a processor and a computer readable storage medium of the building computing device into an information signal; and
    sending the information signal in real-time to an elevator video display.

21. The method set forth in claim 20, wherein the information signal provides elevator occupants visual instructions based at least in-part on the building condition signal.

22. The method set forth in claim 21 further comprising:
sending a real-time elevator car location signal to the building computing device, and wherein the information signal is in-part based on the real-time location of the elevator car.

\* \* \* \* \*